(12) United States Patent
Susnow et al.

(10) Patent No.: US 7,003,059 B1
(45) Date of Patent: Feb. 21, 2006

(54) JABBER COUNTER MECHANISM FOR ELASTIC BUFFER OPERATION

(75) Inventors: Dean S. Susnow, Portland, OR (US); Richard D. Reohr, Jr., Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/500,524

(22) Filed: Feb. 9, 2000

Related U.S. Application Data

(63) Continuation-in-part of application No. 09/432,050, filed on Nov. 1, 1999, now Pat. No. 6,594,329.

(51) Int. Cl.
*G06F 13/36* (2006.01)
*H04L 1/00* (2006.01)

(52) U.S. Cl. .................. 375/351; 375/377; 709/232; 710/310; 370/239

(58) Field of Classification Search ............... 375/212, 375/368, 116, 106, 211; 370/401, 402, 466, 370/222, 452, 909, 509, 513, 94.1, 105, 315, 370/279, 463, 492, 501, 445, 408, 419, 447, 370/246; 710/57, 52, 5, 56; 711/109, 156, 711/170, 202; 340/825.06; 365/221, 223, 365/189.07, 236; 377/34; 341/98; 709/200; 713/500

See application file for complete search history.

(56) References Cited

U.S. PATENT DOCUMENTS

| | | | | |
|---|---|---|---|---|
| 4,974,223 A | * | 11/1990 | Ancheta et al. ............. 370/514 |
| 5,084,841 A | * | 1/1992 | Williams et al. ........ 365/189.07 |
| 5,140,618 A | * | 8/1992 | Kinoshita et al. ........... 375/368 |
| 5,315,590 A | * | 5/1994 | Vijeh et al. ................. 370/246 |
| 5,396,495 A | * | 3/1995 | Moorwood et al. ......... 370/408 |
| 5,430,726 A | * | 7/1995 | Moorwood et al. ......... 370/438 |
| 5,446,735 A | * | 8/1995 | Tobagi et al. ............... 370/445 |
| 5,513,376 A | * | 4/1996 | Lohmeyer .................... 710/53 |
| 5,555,524 A | * | 9/1996 | Castellano .................. 365/221 |
| 5,671,227 A | * | 9/1997 | Keller et al. ................ 370/509 |
| 5,754,540 A | * | 5/1998 | Liu et al. .................... 370/315 |
| 5,754,764 A | * | 5/1998 | Davis et al. ................ 709/200 |
| 5,970,069 A | * | 10/1999 | Kumar et al. ............... 370/402 |
| 6,028,837 A | * | 2/2000 | Miller ........................ 370/222 |
| 6,434,642 B1 | * | 8/2002 | Camilleri et al. ............. 710/57 |

OTHER PUBLICATIONS

Level One Communications, Data Sheet, LXT902, Ethernet Twisted Pair MAU, Apr. 1997, Revision 2.1, pp.:11-39, -44,-50.*
IEEE Std 802.3, 1998 Edition, Part 3: Carrier sense multiple access with collision detection (CSMA/CD) access method and physical layer specifications, pp. 20, 296-306, 331-333.*

* cited by examiner

*Primary Examiner*—Jay K. Patel
*Assistant Examiner*—Jacob Meek
(74) *Attorney, Agent, or Firm*—Robert D. Anderson

(57) ABSTRACT

An Elastic Buffer is provided to process data in a computer network and a write controller is provided to control memory storage operation of such an Elastic Buffer. The write controller may comprise a comparator mechanism which detects if link data from a source contains an IDLE signal; a Jabber counter mechanism which counts each cycle of a link clock in which an IDLE signal is not detected, and resets the count each time the IDLE signal is detected, and which asserts a DISABLE signal for a single link clock cycle if a count value reaches a programmed time-out value; and a logic gate which logically combines outputs from the comparator mechanism and the Jabber counter mechanism to generate a Write control signal for prohibiting a corresponding link data sequence from being stored in memory storage of the Elastic Buffer so as to prevent data overflow in the memory storage.

26 Claims, 9 Drawing Sheets

JABBER COUNTER MECHANISM FOR ELASTIC BUFFER OPERATION

CROSS-REFERENCE TO RELATED APPLICATION

This application is a continuation-in-part of prior application for Elastic Buffer filed on Nov. 1, 1999, there duly assigned Ser. No. 09/432,050, now U.S. Pat. No. 6,594,329, and claims therefrom all benefits accruing under 35 U.S.C. §120.

TECHNICAL FIELD

The present invention relates to data transfer interface technology in a computer network, and more particularly, relates to the Next Generation Input/Output (NGIO) Elastic Buffer provided to process data in the computer network, and a jabber counter mechanism for preventing data overflow in such Elastic Buffer operation.

BACKGROUND

Computer input/output (I/O) performance has become crucial to applications today because of the use of the Internet, intranets, and extranets. Key applications deployed in most Information Technology (IT) enterprises are typically predicated upon I/O subsystem performance in handling key I/O tasks to deliver data to and from computer's main CPU. These applications may include all Internet applications ranging from Web severs to Internet-based e-commerce and TCP/IP network handling, mail and messaging, on-line transaction processing, and key packaged decision-support applications. Other IT infrastructure changes have also increased the burden on computer server I/O.

Emerging solutions to many of the current server I/O shortcomings include the "Next Generation I/O" (NGIO) technology which provides a channel oriented, switched fabric, serial link architecture designed to meet the growing needs of I/O reliability, scalability and performance on commercial high-volume servers. Next Generation I/O introduces the use of an efficient engine that is coupled to host memory which replaces shared buses with a fabric of switchable point-to-point links. This approach decouples the CPU from the I/O subsystem and addresses the problems of reliability, scalability, modular packaging, performance and complexity. Communication between CPU and peripherals occurs asynchronously with the I/O channel engine. The I/O channel engine is utilized to transport data to and from main memory and allow the system bus to act as a switch with point-to-point links capable of near linear scaling with CPU, memory and peripheral performance improvements.

One challenge to implementing a computer network which utilizes an NGIO architecture is to ensure that high-speed data communications between a data transmitter (source node) and a data receiver (destination node) operating in two different clocks are synchronous with respect to the transmission and reception of data within each data packet. Such data transmitter and data receiver may correspond to different nodes of a computer network which operate in synchrony with different clock signals. Failure to maintain synchronism between the data transmitter and data receiver may result in mis-communication and therefore, effective loss of data.

One method commonly employed to establish data synchronization between a data transmitter and a data receiver in a computer network is the use of an elastic buffer which can elastically compensate for any time difference in the transmitter rate and the receiver rate. Conventional elastic buffers may typically be implemented to dynamically adjust the data rate of a data stream so as to synchronize the data transmitter with the data receiver. There are, however, a number of problems associated with the use of conventional elastic buffers. One major problem is known as a data overflow/underflow which pertains to the need to ensure that data is read from the buffer in the same order that it was written to the buffer. Reading data that has not been written or writing data over data that has not yet been read may destroy the integrity of the data packet being transferred between the data transmitter and the data receiver. Another problem relates to the proper control of the elastic buffer and the network specific application.

Since NGIO is an emerging technology not yet in the marketplace, there is no known elastic buffer specifically implemented for NGIO application. There is no advanced elastic buffer design for transitioning link data from a NGIO link which operates in a Link Clock Domain into a data receiver which operates in a Receiver Clock Domain. Moreover, there is no circuit design for an NGIO link architecture implemented to prohibit data overflow which can corrupt the received Link Data and data underflow which can corrupt the Receiver Data being processed.

Accordingly, there is a need for an advanced Elastic Buffer provided to process data in a computer network using an NGIO link architecture, and an especially designed mechanism for preventing such an Elastic Buffer from data overflow under any conditions while enhancing reliability of Elastic Buffer operation and ensuring data integrity at the receiver interface.

SUMMARY

Accordingly, various embodiments of the present invention are directed to an Elastic Buffer provided to process data in a computer network and a write controller provided to control memory storage operation of such an Elastic Buffer. The write controller may comprise a comparator mechanism which detects if link data from a source contains an IDLE signal; a Jabber counter mechanism which counts each cycle of a link clock in which an IDLE signal is not detected, and resets the count each time the IDLE signal is detected, and which asserts a DISABLE signal for a single link clock cycle if a count value reaches a programmed time-out value; and a logic gate which logically combines outputs from the comparator mechanism and the Jabber counter mechanism to generate a Write control signal for prohibiting a corresponding link data sequence from being stored in memory storage of the Elastic Buffer so as to prohibit data overflow in the memory storage.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein.

DETAILED DESCRIPTION

The present invention is applicable for use with all types of computer networks, I/O channel adapters and chipsets, including follow-on chip designs which link together end stations such as computers, servers, peripherals, storage devices, and communication devices for data communications. Examples of such computer networks may include a local area network (LAN), a wide area network (WAN), a campus area network (CAN), a metropolitan area network (MAN), a global area network (GAN) and a system area network (SAN), including newly developed computer networks using Next Generation I/O (NGIO) and Future I/O (FIO) and Server Net and those networks which may become available as computer technology advances in the future. LAN system may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on exemplary use of an elastic buffer for use in a simple computer network having several example nodes (e.g., end stations including computers, servers and/or I/O devices) interconnected by corresponding links in compliance with the "*Next Generation I/O Architecture*" for link specification and switch specification as set forth by the NGIO Forum on Mar. 26, 1999, although the scope of the present invention is not limited thereto.

Figure 1:
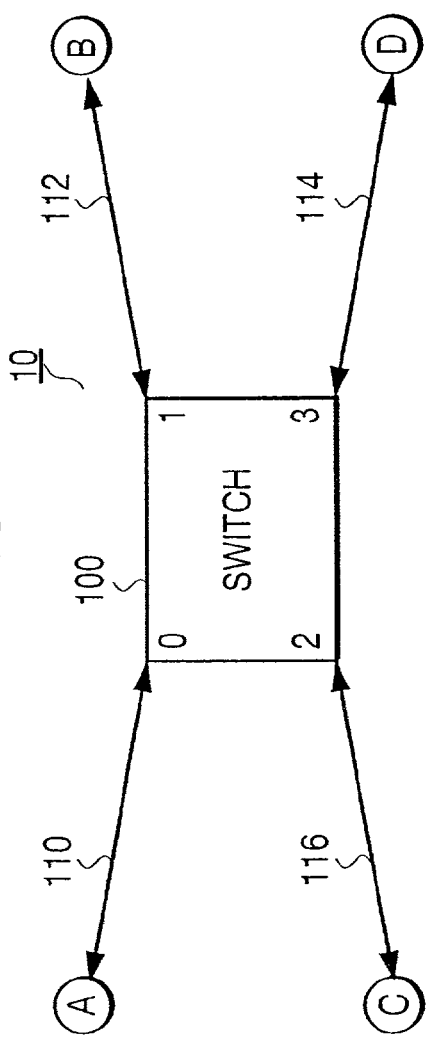
FIG. 1 illustrates a simple computer network having several interconnected nodes for data communications according to an embodiment of the present invention.

Attention now is directed to the drawings and particularly to FIG. 1, a simple computer network 10 having several interconnected nodes for data communications according to an embodiment of the present invention is illustrated. As shown in FIG. 1, the computer network 10 may include, for example, one or more centralized switches 100 and four different nodes A, B, C, and D. Each node may correspond to an end station including, for example, a computer, a server and/or an input/output (I/O) device. The centralized switch 100 may contain switch ports 0, 1, 2, and 3 each connected to a corresponding node of the four different nodes A, B, C, and D via a corresponding physical link 110, 112, 114, and 116. Each link may be a bi-directional communication path between two connect points (e.g., switches or end stations) in the computer network. The centralized switch 100 may also contain routing information using, for example, explicit routing and/or destination address routing for routing data from a source node (data transmitter) to a destination node (data receiver) via corresponding link(s), and re-routing information for redundancy. The specific number and configuration of end stations, switches and links shown in FIG. 1 is provided simply as an example computer network. The computer network 10 may include any number of end stations, switches and links.

Figure 2:
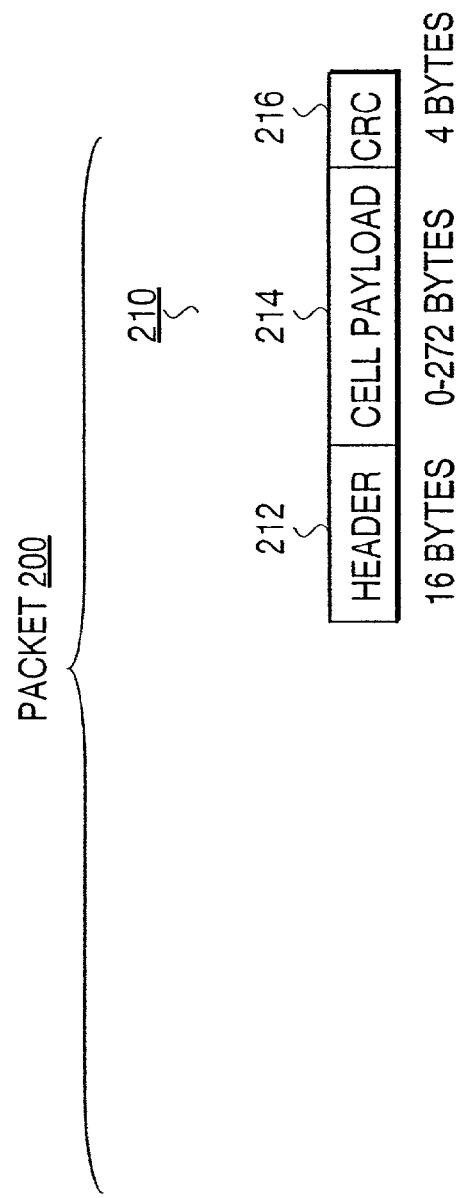
FIG. 2 illustrates packet and cell formats of data transmitted from a source node (data transmitter) to a destination node (data receiver) in an example computer network according to an embodiment of the present invention.

FIG. 2 illustrates an embodiment of packet and cell formats of data transmitted from a source node (data transmitter) to a destination node (data receiver) through switches and/or intermediate nodes according to the "*Next Generation I/O Architecture*" for link specification as set forth by the NGIO Forum on Mar. 26, 1999. As shown in FIG. 2, a packet 200 may represent a sequence of one or more cells 210. Each cell 210 may include a fixed format header information 212, a variable format cell payload 214, and a cyclic redundancy check (CRC) information 216. The header information 212 may consist of 16 bytes of media control access information which specifies cell formation, format and validation. Each cell payload provides appropriate packet fields plus up to 256 bytes of data payload. The cell CRC may consist of 4-bytes of checksum for all of the data in the cell. Accordingly, the maximum size cell as defined by NGIO specification may be 292 bytes (256-byte Data Payload, 16-byte Header, 16-Byte Virtual Address/Immediate data, and 4-byte CRC).

Signaling protocol for NGIO links according to the "*Next Generation I/O Architecture*" for Link Specification may contain code groups for signaling the beginning and end of a cell and for the gap between cells, and code groups for controlling the flow of cells across the link. For example, Start of Cell Delimiter (SCD) and End of Cell Delimiter (ECD) characters, inter-cell flow control sequences (Comma character and associated flow control character) and IDLE characters may be taken into account to determine the maximum defined period between IDLE characters.

Specifically, the IDLE characters may be available in two distinct IDLE sequences (IDLE Ordered Sets of IDLE-1 and IDLE-2). IDLE-1 is defined to be a received sequence of a Comma control character (K28.5 code groups—symbol chosen for synchronization and alignment function) followed by the defined IDLE-1 data character (D31.2). IDLE-2 is defined to be a received sequence of a Comma control character (K28.5) followed by the defined IDLE-2 data character (D22.1). IDLE characters may be transmitted on the NGIO Link either during Link Synchronization periods (initial establishment of communication with the remote device) or inter-cell gap periods (IDLE periods which must occur between transmitted cells—typically a multiple number of IDLE & Flow control pairs).

Figure 3:
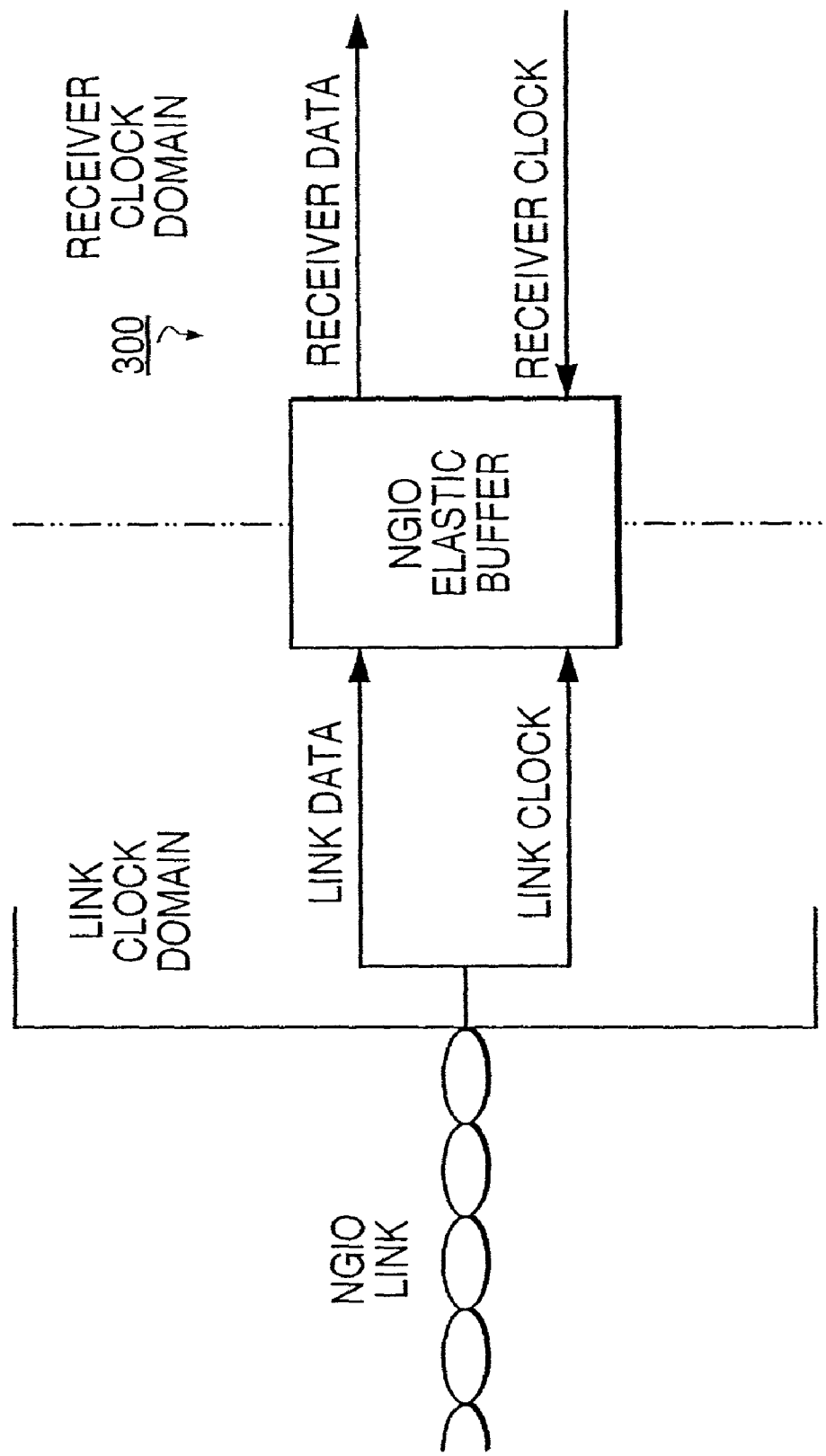
FIG. 3 illustrates an example NGIO Elastic Buffer provided to transition data from an NGIO link into a target clock domain of a device responsible for processing that data in an example computer network according to an embodiment of the present invention.

Turning now to FIG. 3, an example NGIO Elastic Buffer 300 is provided for enabling data received from a data transmitter (source node), via an NGIO link, in a Link Clock Domain to be synchronized into a Receiver Clock Domain of a data receiver (destination node) responsible for processing that data in a computer network according to an embodiment of the present invention. As shown in FIG. 3, the NGIO elastic buffer 300 may correspond to a block of logic (e.g., hardware, software and firmware) residing between an NGIO link and a data receiver (destination node or end station for processing data information received from the NGIO link) that is responsible for accepting, storing data received from the NGIO link which operates in a Link Clock Domain (external clock domain), and transferring the Link Data to the data receiver which operates in a Receiver Clock Domain (internal clock domain) asynchronous to the Link Clock Domain. Both the Link Clock Domain and the Receiver Clock Domain operate at the same frequency (for example, 125 MHz), but from different clock sources. However, there may be potential differences in the frequencies between the clock sources (e.g., Link Clock and quartz Receiver Clock) since each clock has a small degree of deviation, for example, +/−100 parts per million (ppm). For instance, the Link Clock may actually operate at 125.1 MHz while the Receiver Clock may operate at 124.9 MHz or vice versa. If the Link Clock from the data transmitter is slightly faster and the Receiver Clock of the data receiver is slightly slower or vice versa, these clocks may deviate at worse by 200 ppm. Due to the potential differences in the frequencies of the two clock sources, the two clock domains may differ by a single data character every 5000 clock cycles (obtained from 1 million/200 parts). Therefore, if the Link Clock from the data transmitter happens to be faster than the Receiver Clock, then the Link Data arrives faster than the data receiver may process the Link Data. Consequently, Link Data may be over-run (overflow) and may be lost at the receiver interface. Likewise, if the Receiver Clock happens to be faster than the Link Clock, there may be times where there may be no Receiver Data to process due to the respective clock differences. Consequently, Link Data may be under-run (underflow) and the same data may be processed twice since the Receiver Clock is faster. In either situation, the Receiver Data may not correspond to the data actually transmitted on the NGIO Link from a data transmitter (source node) in a computer network, and miscommunication (data corruption) and effective loss of data may occur. As a result, the NGIO Elastic Buffer 300 according to an embodiment of the present invention may be specifically implemented to prevent data over-run (overflow) and data under-run (underflow). Generally, data over-run (overflow) may be prevented when IDLE characters included in Link Data are identified and prohibited from memory storage so as to effectively reduce the incoming data rate. Data under-run (underflow) may be prevented when No-Operation (NOP) characters ("wait state" characters) are inserted into the Link Data for purposes of completeness so as to effectively increase the incoming data rate.

Figure 4:
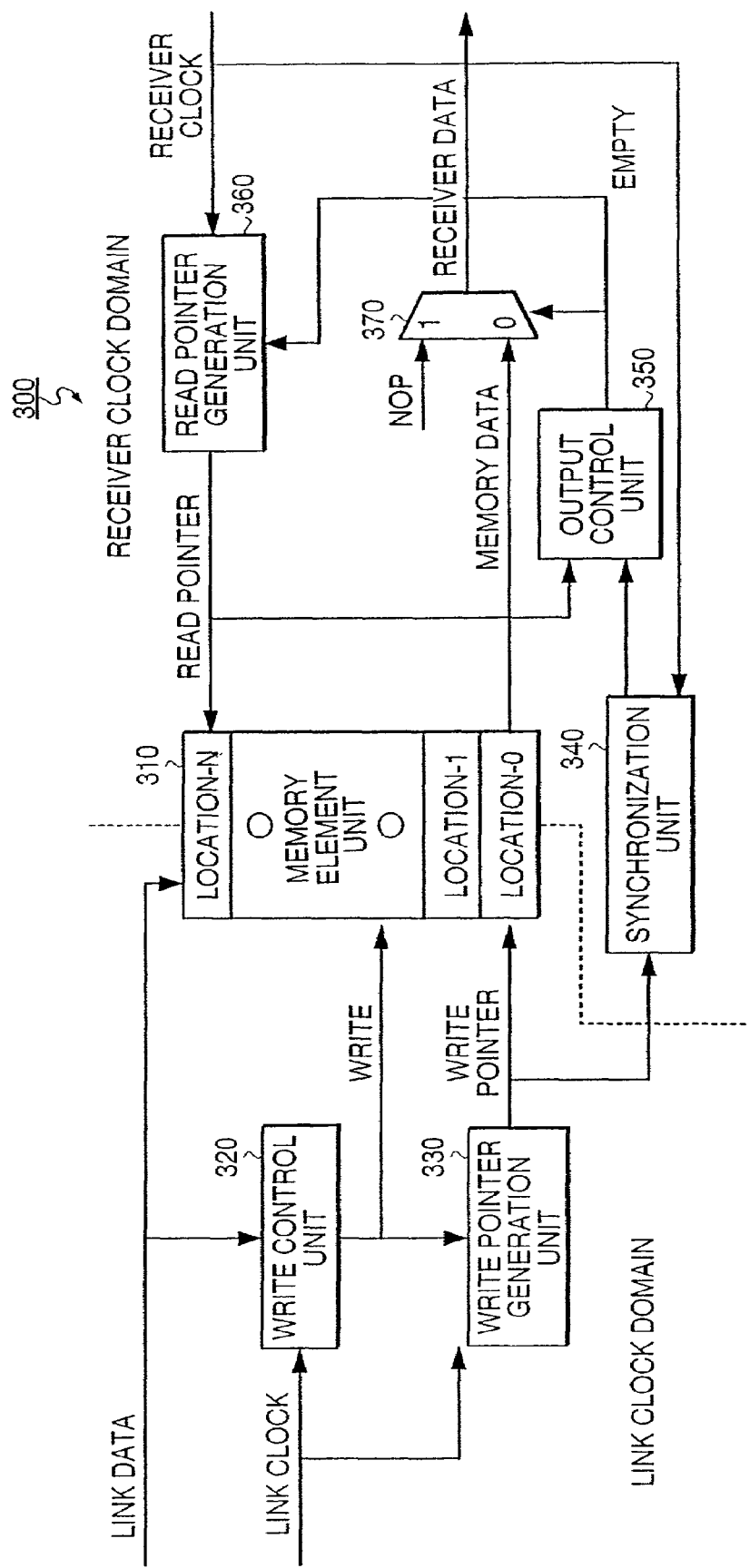
FIG. 4 illustrates an example block diagram of the NGIO Elastic Buffer provided to transition data from an NGIO link into a target clock domain of a device responsible for processing that data in an example computer network according to an embodiment of the present invention.

Referring now to FIG. 4, an example block diagram of the NGIO Elastic Buffer 300 provided to transition data from an NGIO link into a target clock domain of a device (e.g., node or end station) responsible for processing that data in a computer network without data over-run (overflow) and data under-run (underflow) according to an embodiment of the present invention is illustrated. As shown in FIG. 4, the Elastic Buffer 300 may comprise a Memory Element unit 310, a Write Control unit 320, a Write Pointer Generation unit 330, a Synchronization unit 340, a Read Pointer Generation unit 360, an Output Control unit 350, and an Output Selection unit 370. The Memory Element unit 310, the Write Control unit 320 and the Write Pointer Generation unit 330 operate in the Link Clock Domain, and are primarily responsible for storing Link Data into the Memory Element unit 310 and prohibiting data overflow, which can corrupt the received Link Data. Similarly, the Synchronization unit 340, the Read Pointer Generation unit 360, the Output Control unit 350, and the Output Selection unit 370 operate in the Receiver Clock Domain, and are primarily responsible for retrieving the stored Link Data from the Memory Element unit 310 and prohibiting data underflow, which can corrupt the Receiver Data being processed.

The Memory Element unit 310 may be a temporary storage device for received Link Data to be processed by the corresponding data receiver. The memory element may be a FIFO (First-In First-Out) data structure. The Link Data may be stored sequentially into the Memory Element unit 310 in the order it was received so as to allow the corresponding Data Receiver to process the data in sequential order. A typical FIFO may, however, present two distinct problems which relates to data over-run (overflow) and data under-run (underflow). Data over-run may occur when the Link Clock is faster than the receive clock and the FIFO essentially fills up. Since there is no more room in the FIFO for the data (because the data receiver is too slow) Link Data may be lost. Data under-run may occur when the Receiver Clock is faster than the Link Clock and the corresponding Memory Element and data receiver are starved for Link Data. Data over-run and data under-run may be advantageously avoided or eliminated, however, by way of the Write Control unit 320, the Write Pointer Generation unit 330, the Synchronization unit 340, the Output Control unit 350, the Read Pointer Generation unit 360 and the Output Selection unit 370 according to the present invention. The Memory Element depth may be calculated by the potential differences in frequencies of the Link Clock Domain versus the Receiver Clock Domain and the inherent characteristics of an NGIO Link.

As defined by the NGIO Link Specification, the maximum cell size may be 292 bytes (256-byte Data Payload, 16-byte Header, 16-Byte Virtual Address/Immediate data and 4-byte CRC). Start and End of Cell delimiter characters and inter-cell flow control sequences (Comma character and associated Flow Control character) may be taken into account to determine the maximum defined period between IDLE characters. Therefore, a maximum of 296 non-IDLE characters or 296 Link Clock can occur between successive IDLE characters. This number along with the absolute differences in frequencies between the two clock domains may be used to determine the amount of additional locations needed in the Memory Element unit 310. In addition, the Memory Element unit 310 employs two additional locations for write pointer synchronization into the Receiver Clock Domain. The Memory Element unit 310 may be implemented using a traditional FIFO register or simply successive banks of D-type flip-flops to provide the necessary elasticity required to properly synchronize the Link Data to the local Receiver Clock.

The Write Control unit 320 may be provided to examine all data received from the NGIO Link and determine which characters are relevant and require further processing by the data receiver. In particular, the Write Control unit 320 functions to identify NGIO specific IDLE sequences as defined by the NGIO Link Specification, including IDLE-1 as a received sequence of a Comma control character (K28.5) followed by the defined IDLE-1 data character (D31.2), and IDLE-2 as a received sequence of a Comma control character (K28.5) followed by the defined IDLE-2 data character (D22.1). IDLE characters are transmitted on the NGIO Link either during Link Synchronization periods (initial establishment of communication with the remote device) and/or inter-cell gap periods (IDLE periods which must occur between transmitted cells). In either case, the data receiver gains no functionality by having these IDLE characters present in received Link Data stream. Therefore, these IDLE characters may be prohibited from entering the Memory Element unit 310 so as to effectively reduce the Link Clock rate without causing the undesirable data over-run of the Memory Element unit 310. Accordingly, the Write Control unit 320 may be utilized to interrogate the received Link Data stream and prohibits IDLE-1 and IDLE-2 characters from being stored in the Memory Element unit 310 and being processed by the data receiver. The WRITE signal output from the Write Control unit 320 determines if the Link Data, currently being received, is an IDLE character or not. The WRITE signal dictates if the received Link Data is to be stored in the Memory Element unit 310 in the current Link Clock cycle. In short, the Write Control unit 320 ensures that no NGIO IDLE characters are to be written into the Memory Element unit 310.

The Write Pointer Generation unit 330 may be provided to maintain the current write address into the Memory Element unit 310 and determine the memory location in the Memory Element unit 310 where the currently received Link Data is to be stored. The Write Pointer Generation unit 330 may be an N-Bit Counter, where $2^N$ represents the total number of memory locations in the Memory Element. For example an 8 location deep Memory Element or FIFO may require a 3-bit counter which serves the function of Write Pointer Generation unit 330. This counter may effectively increment when the WRITE signal from the Write Control unit 320 is asserted, and alternatively, may be prohibited from incrementing when the WRITE signal is de-asserted. In a preferred embodiment, a Gray Counter may be utilized in lieu of a standard Binary Counter for enabling the current value of the Write Pointer to be synchronized into the Receiver Clock Domain and determining the current state of memory fullness of the Memory Element unit 310. This is because only one bit of the Gray Counter may be allowed to change when transitioning from one count value to the next.

The Synchronization unit 340 may be provided to sample the current value of the Write Pointer from the Link Clock Domain in accordance with each Receiver Clock in the Receiver Clock Domain and present the Synchronized Write Pointer to the Output Control unit 350 for examination. In a preferred embodiment, a standard Double Synchronizer may be utilized to allow information from the Link Clock Domain to be effectively examined in the Receiver Clock Domain, which is asynchronous to the Link Clock Domain.

The Output Control unit 350 may be provided to determine the current fullness of the Memory Element unit 310, that is, when the Memory Element unit 310 is empty. Emptiness may be defined when no Link Data remains in the Memory Element unit 310 to be processed by the data receiver. This may occur either during Link Synchronization periods or during inter-cell gap periods since IDLE characters are not stored in the Memory Element unit 310 or if the Receive Clock is faster than the Link Clock. The Output Control unit 350 examines the current state of the Read Pointer which is used to access the Receiver Data from the Memory Element unit 310 and compares the current Read Pointer with the current Write Pointer which is synchronized into the Receive Clock Domain. When the current Read Pointer corresponds to the Synchronized Write Pointer, the Output Control unit 350 may indicate that the Memory Element unit 310 is empty. The EMPTY signal from the Output Control unit 350 may be asserted to indicate this EMPTY condition.

In a preferred embodiment, a simple N-bit Equality Comparison circuit may be utilized to determine when the current Read Pointer corresponds to the Synchronized Write Pointer. Since the two sets of pointers (Read and Write) may be implemented as Gray counters such that only 1-bit changes per clock cycle, only one of the N Double Synchronizers may transition at a given time. This allows the Output Control unit 350 to accurately track memory fullness of the Memory Element unit 310. For example a binary transition from 7 (0x0111) to 8 (0x1000) requires the transition of all 4-bits in a single clock cycle. If the data is latched while this transition was occurring since the domains are asynchronous, an incorrect value may be latched due to set-up and hold violations at the Double Synchronizers causing metastability. The Output Control unit 350 may obtain an incorrect fullness of the Memory Element unit 310 producing undesirable results. The implementation of Gray code counters may prohibit this incorrect transition from happening. At worst the synchronized value may be off by 1-bit which implies the Memory Element unit 310 is empty for one (1) additional cycle. This has no effect on the data receiver and maintains the integrity of the received Link Data.

The Read Pointer Generation unit 360 may be provided to effectively maintain the current read address into the Memory Element unit 310, and determine the memory location in the Memory Element unit 310 where the current Receiver Data is to be retrieved. The Read Pointer Generation unit 360 is essentially a replication of the Write Pointer Generation unit 330 which operates in the Receiver Clock Domain rather than the Link Clock Domain. In other words, the Read Pointer Generation unit 360 may also be an N-Bit Gray Counter, where $2^N$ represents the total number of memory locations in the Memory Element unit 310. The Gray Counter may effectively increment when the EMPTY signal from the Output Control unit 350 is de-asserted, and alternatively, may be prohibited from incrementing when the EMPTY signal is asserted. Thus Receiver Data may be processed when the Memory Element unit 310 is not empty.

The Output Selection unit 370 may be provided to insert No-Operation (NOP) characters into the received Link Data stream when the Memory Element unit 310 is empty. The No-Operation (NOP) characters may be utilized to advantageously eliminate the undesirable data under-run (underflow) of the Memory Element unit 310. This is because the NOP characters are "wait state" characters that exhibit no effect on the data receiver and therefore, may not corrupt the stream of NGIO Link Data. In turn, the data receiver may drop these NOP characters ("wait state" characters) during the Link Data processing.

Figure 5:
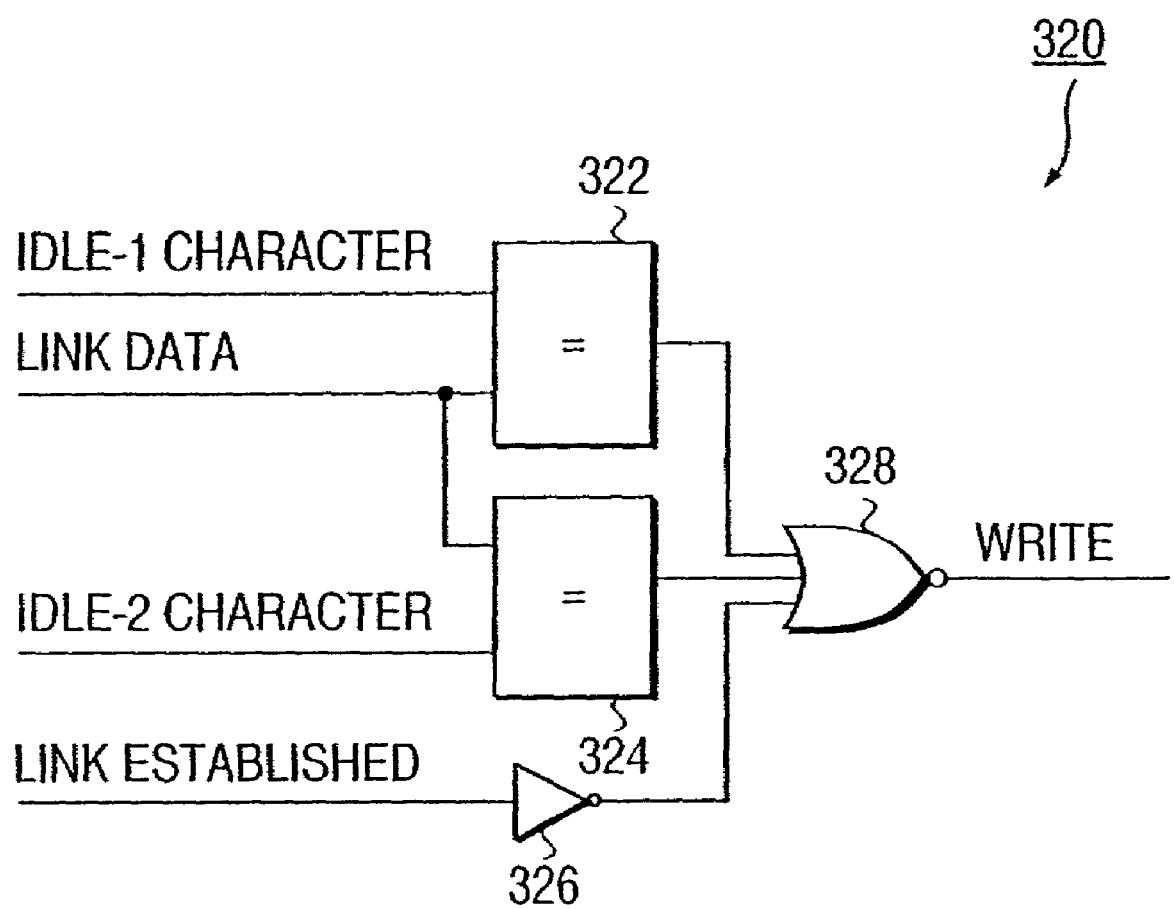
FIG. 5 illustrates an example circuit diagram of an example Write Control unit of the NGIO Elastic Buffer according to an embodiment of the present invention.

FIG. 5 illustrates an example circuit diagram of a Write Control unit 320 of the NGIO elastic buffer 300 provided to examine the received Link Data and determine if the Link Data is to be written into the Memory Element unit 310 according to an embodiment of the present invention. As shown in FIG. 5, the Write Control unit 320 may comprise two equality comparators 322 and 324, an inverter 326 and a NOR gate 328. The first comparator 322 may be utilized to determine if the received Link Data contains an IDLE-1 character. Likewise, the second comparator 324 may be utilized to determine if the received Link Data contains an IDLE-2 character. In either situation, IDLE characters may present no value to the data receiver and may thus be prohibited from being written into the Memory Element unit 310 by way of the NOR gate 328. Thus the WRITE output signal may be asserted when no IDLE characters are received as the current Link Data, and alternatively, may be de-asserted when either an IDLE-1 or IDLE-2 character is received from the current Link Data. Since IDLE characters are prohibited from entering the Memory Element unit 310, the Link Clock may be faster than the Receiver Clock without causing data overflow of the associated Memory Element unit 310.

In addition, the current state of the Link Established signal may be utilized to determine what is written into the Memory Element unit 310, via the inverter 326. When link is not established (Link Established=0), all link data may be prohibited from being written into the Memory Element unit 310 by way of the NOR gate 328 in order to prevent the Memory Element unit 310 from overflowing prior to link establishment. Essentially the NGIO Elastic Buffer may be disabled until the link has been established. At that time all non-IDLE characters may be stored in the NGIO Elastic Buffer for the data receiver.

For normal operation IDLE characters are received at a periodic interval as defined by the NGIO Link Specification. However, in rare situations the necessary IDLE sequences may be corrupted due to possible bit errors generated by either a malfunctioning link or a "jabbering" data transmitter. Such bit errors may be infrequent but may affect the IDLE sequences of the inter-cell gaps. If the IDLE sequences are corrupted in any way, they may not be detected as IDLE sequences and therefore, cannot be removed from the Link Data. As a result, data over-run (overflow) may still occur in those rare situations. In order to guarantee that data over-run (overflow) in an Elastic Buffer may be completely eliminated, an especially designed "Jabber" Counter (logic) mechanism may further be incorporated in such a Write Control unit 320 shown in FIG. 5 for effectively measuring the duration between valid IDLE sequences to de-assert the WRITE output signal for a single Link Clock cycle regardless whether the IDLE sequences may be corrupted or not. The duration may be compared to a programmable time-out expiration value measured in the Link Clock. If at any time the measured duration matches the programmed time-out expiration value, then a corresponding Link Data sequence may be prohibited from being stored in the Memory Element unit 310 of the Elastic Buffer 300. The "Jabber" Counter mechanism may utilize existing logic residing in the Write Control unit 320 and implement the solution with minimal logic gates to enhance the reliability of the Elastic Buffer operation and ensure data integrity at the receiver interface.

Figure 6:
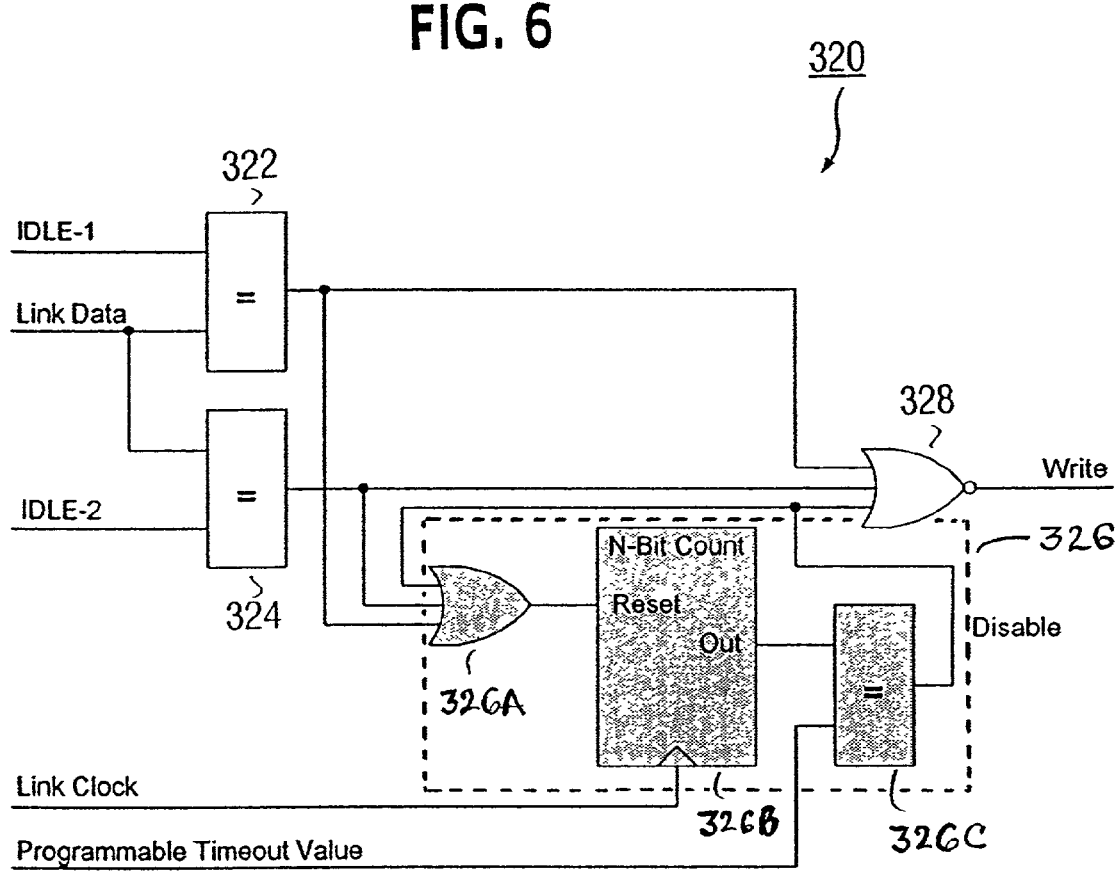
FIG. 6 illustrates a preferred circuit diagram of an example Write Control unit having an especially designed jabber counter mechanism for preventing such an Elastic Buffer from data overflow under any conditions while enhancing the reliability of Elastic Buffer operation and ensuring data integrity at the receiver interface according to an embodiment of the present invention.

Referring now to FIG. 6, a preferred circuit diagram of an example Write Control unit 320 having an especially designed Jabber Counter mechanism 326 incorporated therein for preventing such an Elastic Buffer from data overflow under any conditions according to an embodiment of the present invention is illustrated. As shown in FIG. 6, the preferred Write Control unit 320 may comprise two input equality comparators 322 and 324, but also an especially designed Jabber Counter mechanism 326, and a NOR gate 328. The first comparator 322 may be utilized to determine if the received Link Data contains an IDLE-1 character. Likewise, the second comparator 324 may be utilized to determine if the received Link Data contains an IDLE-2 character. In either situation, IDLE characters may present no value to the data receiver and may thus be prohibited from being written into the Memory Element unit 310 by way of the NOR gate 328 in the same manner described with reference to FIG. 5. Thus the WRITE output signal may be asserted when no IDLE characters are received as the current Link Data, and alternatively, may be de-asserted when either an IDLE-1 or IDLE-2 character is received from the current Link Data.

As previously described, the Jabber Counter mechanism 326 may be incorporated to ensure that no data overflow may occur during an Elastic Buffer operation even in those rare situations where IDLE sequences may be corrupted due to possible bit errors generated by either a malfunctioning link or a "jabbering" data transmitter. As shown in FIG. 6, such Jabber Counter mechanism 326 comprises an OR gate 326A, a single N-bit counter 326B and a N-bit equality comparator 326C arranged to further de-assert the Write output signal for prohibiting a corresponding Link Data sequence from being stored in the Memory Element unit 310 of the Elastic Buffer 300 for a single Link Clock cycle, when the N-bit count value of the N-bit counter 326B matches a programmable time-out value. The time-out value may be programmed based on the duration between valid IDLE sequences. This way if IDLE characters are received at a periodic interval as defined by the NGIO Link Specification, the N-bit count value of the N-bit counter 326B may never reach the programmable time-out value. However, if those IDLE characters are not received at the periodic interval due to a malfunctioning link or a "Jabbering" data transmitter, the N-bit count value of the N-bit counter 326B may reach the programmable time-out value so as to de-assert the Write out signal for prohibiting the corresponding Link Data sequence from being stored in the Memory Element unit 310 of the Elastic Buffer 300.

The theory of operation of such Jabber Counter mechanism 326 may be described as follows. First, the N-bit counter 326B may be reset whenever an IDLE-1 or IDLE-2 character is detected by the equality comparators 322 and 324. Otherwise, the N-bit counter 326B may be incremented each Link Clock cycle in which either an IDLE-1 or IDLE-2 character was not detected by the equality comparators 322 and 324. If the current count value of the N-bit counter 326B ever reaches the programmed time-out value by way of the N-bit equality comparator 326C, the DISABLE signal may be asserted for a single Link Clock cycle causing the Write output signal to become disabled, prohibiting the corresponding Link Data from being stored in the Memory Element unit 310 of the Elastic Buffer 300. The DISABLE signal may also cause the N-bit counter 326B to clear synchronously, subsequently restarting the entire counting process. This way the Jabber Counter mechanism 326 eliminates any possibility of data overflow in Elastic Buffer designs regardless of the received Link Data sequence while enhancing the reliability of the Elastic Buffer operation and ensuring data integrity at the receiver interface, ultimately leading to more robust, reliable and higher performance Elastic Buffer designs.

Figure 7:
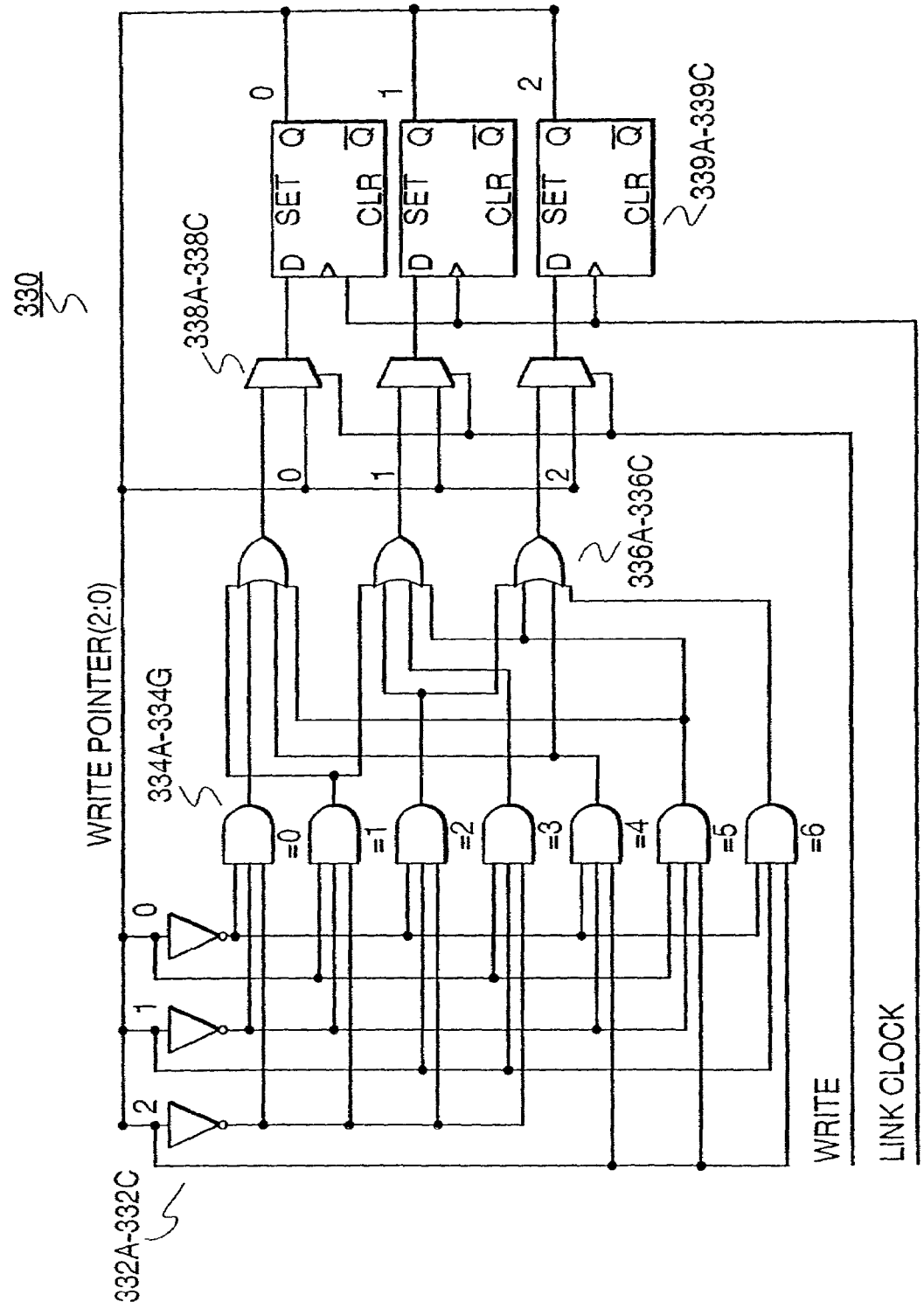
FIG. 7 illustrates an example circuit diagram of an example Write Pointer Generation unit of the NGIO Elastic Buffer according to an embodiment of the present invention.

FIG. 7 illustrates an example circuit diagram of a Write Pointer Generation unit 330 of the NGIO Elastic Buffer 300 provided to determine the address of the memory location where the subsequent link data may be stored in the Memory Element unit 310 according to an embodiment of the present invention. As shown in FIG. 7, the Write Pointer Generation unit 330 may comprise inverters 332A–332C, AND gates 334A–334G, OR gates 336A–336C, multiplexers 338A–338C and a 3-bit Gray Counter comprised of 3-input D flip-flops 339A–339C for accommodating the use of an 8 location deep Memory Element unit 310. The significance of the 3-bit Gray Counter is that only 1 of the 3 bits can change on any given state change. The pattern for the above implementation may be as follows "000", "001", "011", "010", "110", "100", "101" and "111". Only 1-bit may change at a time in order to simplify the synchronization of the Write Pointer into the Receiver Clock Domain for determining the fullness of the Memory Element unit 310.

The WRITE signal from the Write Control unit 320 may be the controlling input. When the WRITE signal is asserted (Write='1') the address may be allowed to increment and the corresponding link data may be written into the Memory Element unit 310 under the control of the 3-bit Gray Counter comprised of 3-input D flip flops 339A–339C. When the WRITE signal is de-asserted (Write='0') the current address may be held constant (feedback directly via multiplexers 338A–338C) for the duration of the Link Clock. On every Link Clock the state of WRITE signal determines if the address may remain constant or increment based on whether the corresponding Link Data is to be written into the Memory Element unit 310.

Figure 8:
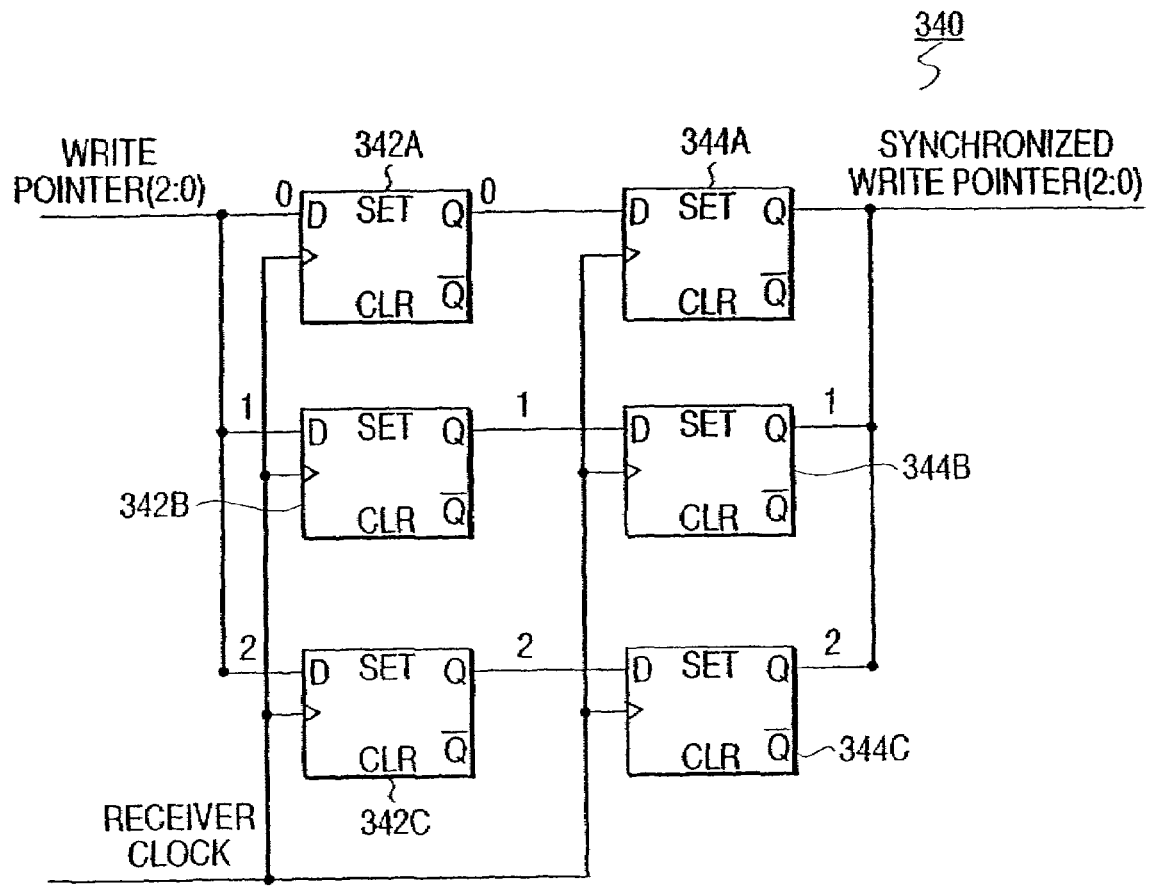
FIG. 8 illustrates an example circuit diagram of an example Synchronization unit of the NGIO Elastic Buffer according to an embodiment of the present invention.

FIG. 8 illustrates an example circuit diagram of a Synchronization unit 340 of the NGIO Elastic Buffer 300 provided to sample the current value of the Write Pointer from the Link Clock Domain in accordance with each Receiver Clock in the Receiver Clock Domain and present the Synchronized Write Pointer to the Output Control unit 350 according to an embodiment of the present invention. As shown in FIG. 8, the Synchronization unit 340 may be a 3-bit Double Synchronizer used to sample the current value of the Write Pointer every Receiver Clock and determine the current fullness of the Memory Element unit 310. The Synchronization unit 340 may include first and second banks (back to back) of serially-connected D flip-flops 342A–342C and 344A–344C. The first and second banks of D-type flip-flops 342A–342C and 344A–344C are driven by the Receiver Clock. The data output of the first bank of D flip-flops 342A–342C are gated into the second bank of D flip-flops 344A–344C and made available at an output line as the Synchronized Write Pointer, which is essentially a snapshot of the current Write Pointer in the Receiver Clock Domain. The first bank of D flip-flops 342A–342C may be expected to go metastable from sampling the asynchronous event. However the settling time may be less than the clock period so the second bank of D flip-flops 344A–344C may not receive the propagation of metastable states. The Gray code may be utilized to accurately track the fullness of the Memory Element unit 310 in the Receiver Clock Domain since at most only one (1) bit is allowed to change every clock edge. This means that at most only 1 of the 3-input D flip-flops 342A–342C of the Double Synchronizer may go metastable. At worst the Double Synchronizer may indicate that the Memory Element unit 310 is empty for one clock cycle in which there is data available.

Figure 9:
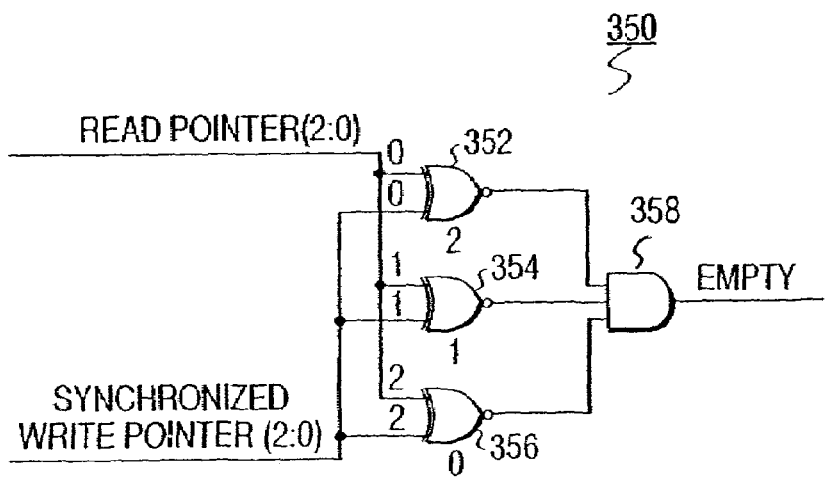
FIG. 9 illustrates an example circuit diagram of an example Output Control unit of the NGIO Elastic Buffer according to an embodiment of the present invention.

FIG. 9 illustrates an example circuit diagram of an Output Control unit 350 of the NGIO Elastic Buffer 300 provided to determine the current fullness of the Memory Element unit 310 according to an embodiment of the present invention. As shown in FIG. 9, the Output Control unit 350 may be a 3-bit equality comparison logic including three XNOR gates 352, 354 and 356 and an AND gate 358. Each of the XNOR gates 352, 354 and 356 may logically combine corresponding bits of the current Read Pointer and the Synchronized Write Pointer and produce a logic output therefrom. The AND gate 358 may then logically combine the logic outputs from the XNOR gates 352, 354 and 356 and produce an output signal indicating whether the Memory Element unit 310 is EMPTY. An EMPTY signal (Empty='1') may be asserted when the current value of the Read Pointer corresponds to the current value of the Synchronized Write Pointer. When the EMPTY signal is asserted, the Data Receiver may be presented with a NOP (No-Operation) command as opposed to the actual link data. On every Receiver Clock cycle that the EMPTY signal is not asserted, the Data Receiver may be provided with actual Link data by means of the Output Selection unit 370.

Figure 10:
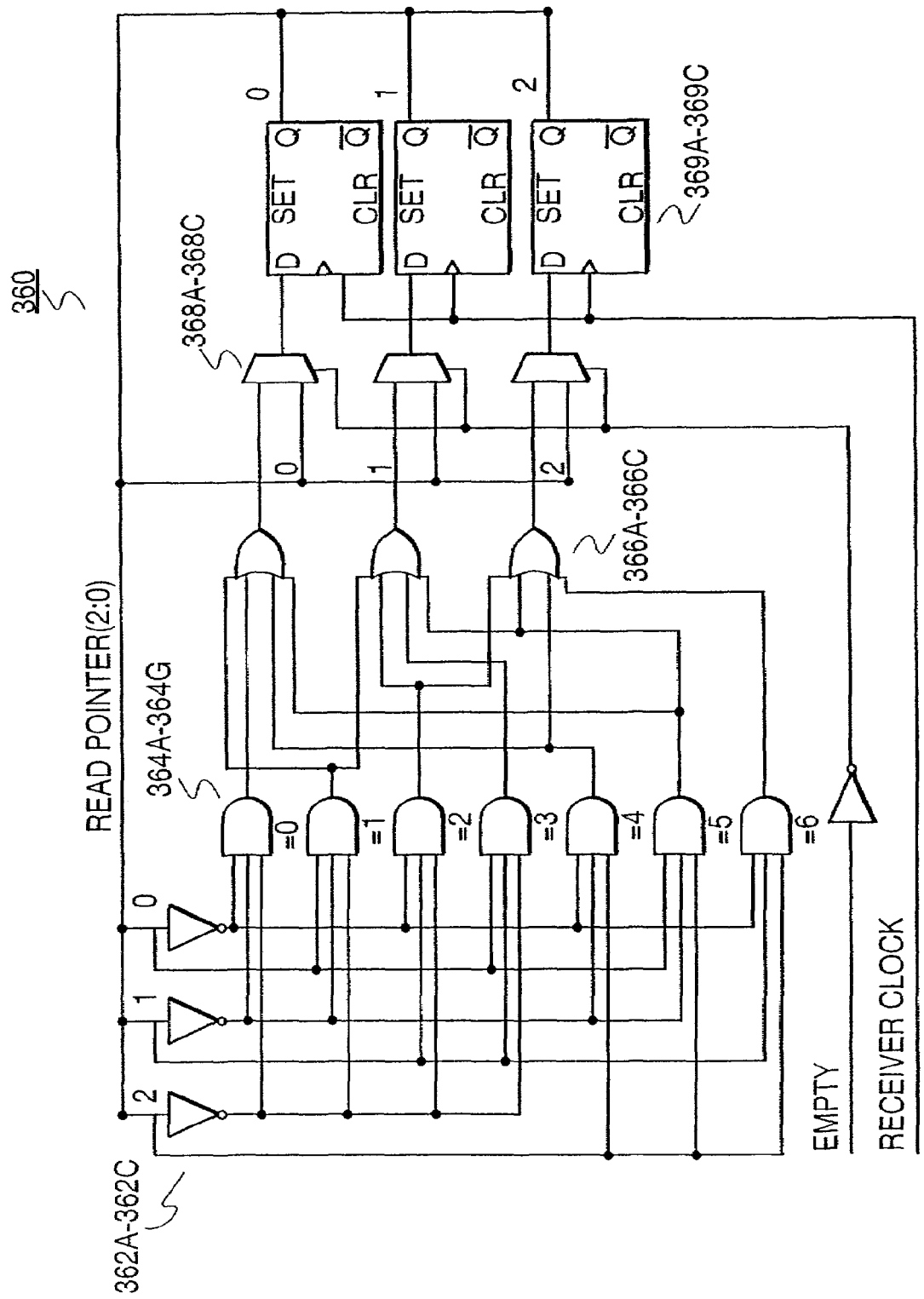
FIG. 10 illustrates an example circuit diagram of an example Read Pointer Generation unit of the NGIO Elastic Buffer according to an embodiment of the present invention.

FIG. 10 illustrates an example circuit diagram of a Read Pointer Generation unit 360 of the NGIO elastic buffer 300 provided to determine the memory location in the Memory Element unit 310 where the current Receiver Data is to be retrieved from according to an embodiment of the present invention. As shown in FIG. 10, the Read Pointer Generation unit 360 may be a replication of the Write Pointer Generation unit 330 shown in FIG. 7. The Read Pointer Generation unit 360 may comprise inverters 362A–362C, AND gates 364A–364G, OR gates 366A–366C, multiplexers 368A–368C and a 3-bit Gray Counter comprised of 3-input D flip-flops 369A–369C for accommodating the use of an 8 location deep Memory Element unit 310.

In contrast to the WRITE signal for use in the Write Pointer Generation unit 330, the EMPTY signal from the Output Control unit 350 may be the controlling input. When the EMPTY signal is de-asserted (Empty='0') the address may be allowed to increment under the control of the 3-bit Gray Counter comprised of 3-input D flip-flops 369A–369C. When the EMPTY signal is asserted (Empty='1') the current address of the Read Pointer may be held constant (feedback from the present states of D flip-flops 369A–369C via multiplexers 368A–368C) for the duration of the Receiver Clock until the next clock cycle. The Read Pointer Generation unit 360 examines the state of the EMPTY signal at every Receiver Clock to determine the next state of the Read Pointer at the rising edge of the Receiver Clock.

Figure 11:
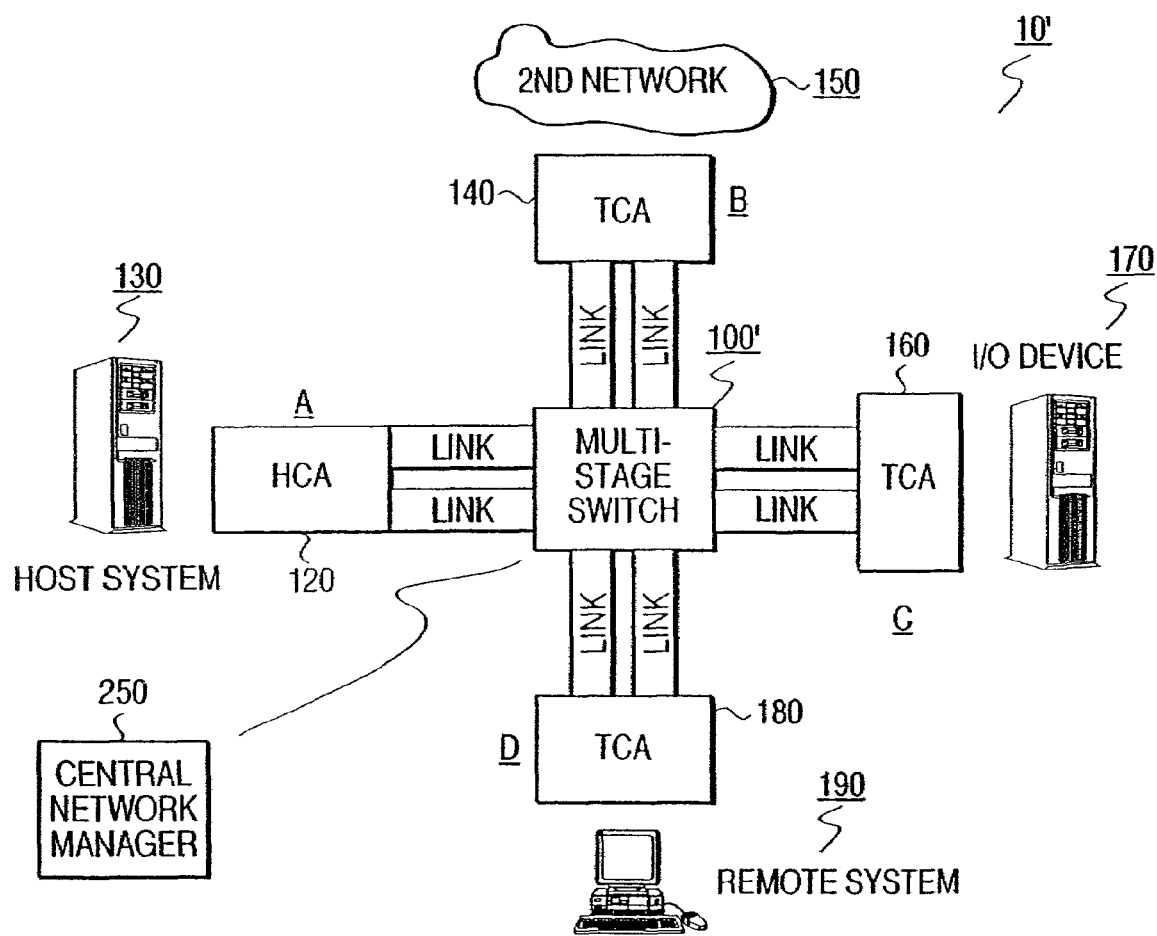
FIG. 11 illustrates an example implementation of an NGIO Elastic Buffer provided in a computer network using an NGIO architecture to transition data from an NGIO link into a target clock domain of a device responsible for processing that data according to an embodiment of the present invention.

FIG. 11 illustrates one example implementation of an NGIO Elastic Buffer 300 provided in a computer network using an NGIO architecture to transition data from an NGIO link into a target clock domain of a device responsible for processing that data according to an embodiment of the present invention. As shown in FIG. 11, the computer network 10' includes a multi-stage switch 100' comprised of a plurality of switches for allowing host systems and target systems to communicate to a large number of other host systems and target systems. In addition, any number of end stations, switches and links may be used for relaying data in groups of cells between the end stations and switches via corresponding NGIO links.

For example, node A may represent a host system 130. Similarly, node B may represent another network, including, but not limited to, local area network (LAN), Ethernet, ATM and fibre channel network 150. Node C may represent an input/output (I/O) device 170. Likewise, node D may represent a remote system 190 such as a computer or a server. Alternatively, nodes A, B, C, and D may also represent individual switches of the multi-stage switch 100' which serve as intermediate nodes between the host system 130 and the target systems 150, 170 and 190.

The multi-state switch 100' may include a central network manager 250 connected to all the switches for managing all network management functions. However, the central network manager 250 may alternatively be incorporated as part of either the host system 130, the second network 150, the I/O device 170, or the remote system 190 for managing all network management functions. In either situation, the central network manager 250 may be configured for learning network topology, determining the switch table or forwarding database, detecting and managing faults or link failures in the network and performing other network management functions.

A host channel adapter (HCA) 120 may be used to provide an interface between a memory controller (not shown) of the host system 130 and a multi-stage switch 100' via high speed serial NGIO links. Similarly, target channel adapters (TCA) 140 and 160 may be used to provide an interface between the multi-stage switch 100' to an I/O controller of either a second network 150 or an I/O device 170 via high speed serial NGIO links. Separately, another host channel adapter (TCA) 180 may also be used to provide an interface between a memory controller (not shown) of the remote system 190 and the multi-stage switch 100' via high speed serial NGIO links.

The NGIO Elastic Buffer 300 having a Jabber counter mechanism 326 may be provided as part of the host channel adapter (HCA) 120 to transition data from an NGIO link into the host system 130 which operates in the Receiver Clock Domain. Separately, the NGIO Elastic Buffer 300 may also be provided as part of the target channel adapters (TCA) 140, 160 and 180 to transition data from an NGIO link into the respective target system which operates in the Receiver Clock Domain, such as a second network 150, an I/O device 170 and a remote system 190.

As described from the foregoing, the present invention advantageously provides an advanced NGIO Elastic Buffer for use in a computer network to transition data from an NGIO link into a target clock domain of a device (e.g., node or end station) responsible for processing that data without data over-run (overflow) and data under-run (underflow). An especially designed "Jabber" Counter (logic) mechanism may further be incorporated in existing Write Control logic with minimal logic gates to eliminate any possibility of data overflow in Elastic Buffer designs in order to enhance the reliability of the Elastic Buffer operation and ensure data integrity at the receiver interface.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the computer network as shown in FIGS. 1 and 11 may be configured differently or employ some or different components than those illustrated. Such computer network may include a local area network (LAN), a wide area network (WAN), a campus area network (CAN), a metropolitan area network (MAN), a global area network (GAN) and a system area network (SAN), including newly developed computer networks using Next Generation I/O (NGIO) and Future I/O (FIO) and Server Net and those networks which may become available as computer technology advances in the future. LAN system may include Ethernet, FDDI (Fiber Distributed Data Interface) Token Ring LAN, Asynchronous Transfer Mode (ATM) LAN, Fiber Channel, and Wireless LAN. In addition, the NGIO elastic buffer shown in FIGS. 3–10 may be configured differently or employ some or different components than those illustrated without changing the basic function of the invention. For example, different combinations of logic gates such as AND, OR, NOR, NAND etc. may be used to construct the Write Control unit 320, the Write Pointer Generation unit 330, the Synchronization unit 340, the Read Pointer Generation unit 360, the Output Control unit 350, and the Output Selection unit 370. Many modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A write controller for controlling memory storage operation of an Elastic Buffer, comprising:
    a comparator mechanism which detects if link data from a source contains an IDLE signal;
    a Jabber counter mechanism which counts each cycle of a link clock in which an IDLE signal is not detected, and resets said count each time said IDLE signal is detected, and which asserts a DISABLE signal for a single link clock cycle if said count reaches a programmed time-out value; and
    a logic gate which logically combines outputs from said comparator mechanism and said Jabber counter mechanism to generate a Write control signal for prohibiting a corresponding link data sequence from being stored in said memory storage of said Elastic Buffer so as to prevent data overflow in said memory storage;
    wherein said memory storage corresponds to one of a first-in, first-out (FIFO) register and a succession of D-type flip-flops having an elasticity required to synchronize said link data to a receiver clock subsequently used to retrieve said link data from said memory storage as receiver data; and
    wherein said memory storage comprises a plurality of addressable memory locations determined by the potential differences in frequencies of the link clock and the receiver clock, and non-IDLE characters included in said link data.

2. The write controller as claimed in claim 1, wherein said comparator mechanism comprises:
    a first comparator which determines if received link data contains a first IDLE sequence of said IDLE signal; and
    a second comparator which determines if the received link data contains a second IDLE sequence of said IDLE signal.

3. The write controller as claimed in claim 1, wherein said Jabber counter mechanism comprises:
    a N-bit counter which counts each cycle of said link clock in which an IDLE signal is not detected, and resets said count each time said IDLE signal is detected and said DISABLE signal is asserted for a single link clock cycle if said count reaches said programmed time-out value;
    an OR gate which logically combines outputs from said comparator mechanism and said DISABLE signal to reset said count of said N-bit counter; and
    a N-bit equality comparator which compares said count of said N-bit counter with said programmed time-out value and asserts said DISABLE signal if said count reaches said programmed time-out value.

4. The write controller as claimed in claim 1, wherein said comparator mechanism corresponds to two equality comparators, and said logic gate corresponds to an NOR gate.

5. The write controller as claimed in claim 1, further comprising operation at a link clock for selecting as a write address the address of a memory location of said memory storage to store said link data therein, and for preventing an IDLE signal included in said link data from being stored in said memory storage so as to prohibit data overflow in said memory storage.

6. The write controller as claimed in claim 5, further comprising a write pointer which operates at said link clock for selecting as said write address the address of a memory location of said memory storage to store said link data therein.

7. The write controller as claimed in claim 6, wherein said write pointer comprises a gray code counter.

8. The write controller as claimed in claim 7, wherein said link data is received from said source via physical links in compliance with the Next Generation I/O (NGIO) Link Architecture Specification.

9. The write controller as claimed in claim 5, wherein said Elastic Buffer further comprises a read control mechanism which operates at a receiver clock for selecting as a read address the address of a memory location of said memory storage to retrieve said link data as receiver data, and for inserting No-Operation (NOP) sequences into said receiver data when said memory storage is determined empty so as to prohibit data underflow in said memory.

10. The write controller as claimed in claim 9, wherein said read control mechanism comprises:
  a read pointer which operates at said receiver clock for selecting as said read address the address of a memory location of said memory storage to retrieve said link data as said receiver data in dependence upon whether said memory storage is determined empty;
  an output controller which determines said memory storage as empty when said read address corresponds to said write address; and
  an output selector which inserts said No-Operation (NOP) sequences into said receiver data when said memory storage is determined empty.

11. The write controller as claimed in claim 10, further comprising a synchronizer which synchronizes the current value of said write address in a link clock domain with the current value of said read address in a receiver clock domain.

12. The write controller as claimed in claim 10, wherein said output controller comprises:
  a plurality of XNOR gates each of which logically combines said read address and said write address in synchronous with said read address; and
  an AND gate which logically combines logic outputs from the XNOR gates and produces an output signal indicating whether said memory storage is empty.

13. The write controller as claimed in claim 10, wherein said read pointer comprises a gray code counter.

14. The write controller as claimed in claim 10, wherein said output selector comprises a multiplexer for selecting between said receiver data and said NOP sequences inserted in said receiver data in dependence upon whether said memory storage is determined empty.

15. A computer network, comprising:
  a host system;
  at least one remote system;
  a multi-stage switch comprising a plurality of different switches which interconnect said host system via a host channel adapter to said remote system via a remote channel adapter along different physical links for data communications, and
  at least one elastic buffer provided in said host channel adapter of said host system for transferring data from a physical link into said host channel adapter which, said elastic buffer comprising:
    a memory storage coupled to receive link data from said physical link and to store said link data in a plurality of addressable memory locations;
    a write control mechanism which operates at a link clock for selecting as a write address the address of a memory location of said memory storage to store said link data, said write control mechanism comprising a Jabber counter which counts against a programmed time-out value to prevent a corresponding link data sequence from being stored in said memory storage so as to prohibit data overflow in said memory storage; and
    a read control mechanism which operates at a receiver clock for selecting as a read address the address of a memory location of said memory storage to retrieve said link data as receiver data, and for inserting No-Operation (NOP) sequences into said receiver data when said memory storage is determined empty so as to prohibit data underflow in said memory storage;
  wherein said write control mechanism further comprises:
    a write controller which operates at said link clock for prohibiting said IDLE signal included in said link data from being stored in said memory storage; and
    a write pointer which operates at said link clock for selecting as said write address the address of a memory location of said memory storage to store said link data therein.

16. The computer network as claimed in claim 15, wherein said write controller comprises:
  a first comparator which determines if received link data contains a first IDLE sequence of said IDLE signal;
  a second comparator which determines if the received link data contains a second IDLE sequence of said IDLE signal;
  said Jabber counter which counts each cycle of a link clock in which an IDLE signal is not detected, and resets said count each time said IDLE signal is detected, and which asserts a DISABLE signal for a single link clock cycle if said count reaches said programmed time-out value; and
  a logic gate which logically combines outputs from said first and second comparators and said Jabber counter to generate a Write control signal for prohibiting a corresponding link data sequence from being stored in said memory storage so as to prevent data overflow in said memory storage.

17. The computer network as claimed in claim 16, wherein said Jabber counter comprises:
  a N-bit counter which counts each cycle of said link clock in which an IDLE signal is not detected, and resets said count each time said IDLE signal is detected and said DISABLE signal is asserted for a single link clock cycle if said count reaches said programmed time-out value;
  an OR gate which logically combines outputs from said first and second comparators and said DISABLE signal to reset said count of said N-bit counter; and
  a N-bit equality comparator which compares said count of said N-bit counter with said programmed time-out value and asserts said DISABLE signal if said count reaches said programmed time-out value.

18. The computer network as claimed in claim 15, wherein said memory storage corresponds to one of a first-in first-out (FIFO) register and a succession of D-type flip-flops having an elasticity required to synchronize said link data to said receiver clock.

19. The computer network as claimed in claim 15, wherein said link data is received via said physical links in compliance with the Next Generation I/O (NGIO) Link Architecture Specification.

20. The computer network as claimed in claim 15, wherein said plurality of addressable memory locations of said memory storage are determined by the difference in frequency of the link clock and the receiver clock, and non-IDLE characters included in said link data.

21. The computer network as claimed in claim 15, wherein said read control mechanism comprises:
   a read pointer which operates at said receiver clock for selecting as said read address the address of a memory location of said memory storage to retrieve said link data as said receiver data in dependence upon whether said memory storage is determined empty;
   an output controller which determines said memory storage as empty when said read address corresponds to said write address; and
   an output selector which inserts said No-Operation (NOP) sequences into said receiver data when said memory storage is determined empty.

22. The computer network as claimed in claim 21, wherein said output controller comprises:
   a plurality of XNOR gates each of which logically combines said read address and said write address in synchronous with said read address; and
   an AND gate which logically combines logic outputs from the XNOR gates and produces an output signal indicating whether said memory storage is empty.

23. The computer network as claimed in claim 21, wherein said read pointer comprises a gray code counter.

24. The computer network as claimed in claim 21, wherein said output selector comprises a multiplexer for selecting between said receiver data and said NOP sequences inserted in said receiver data in dependence upon whether said memory storage is determined empty.

25. The computer network as claimed in claim 15, further comprising a synchronizer which synchronizes the current value of said write address in a link clock domain with the current value of said read address in a receiver clock domain.

26. The computer network as claimed in claim 15, wherein said write pointer comprises a gray code counter.

* * * * *